United States Patent [19]
Colsen et al.

[11] 3,710,317
[45] Jan. 9, 1973

[54] AUTO ALARM SYSTEM

[75] Inventors: Frank Thomas Colsen; Peter Kaufman; Robert L. Townsend, all of Santa Barbara, Calif.

[73] Assignee: Educated Vehicle Systems, Inc., Santa Barbara, Calif.

[22] Filed: May 19, 1971

[21] Appl. No.: 144,810

[52] U.S. Cl. ..................................340/64, 200/44
[51] Int. Cl. ..............................................B60r 25/00
[58] Field of Search .........340/63, 64, 65; 200/42, 44

[56] References Cited

UNITED STATES PATENTS

| | | | |
|---|---|---|---|
| 2,238,246 | 4/1941 | Chapel | 340/63 |
| 2,782,396 | 2/1957 | Marsh et al. | 340/63 |
| 2,839,736 | 6/1958 | Tinsley et al. | 340/63 |

*Primary Examiner*—Alvin H. Waring
*Attorney*—Finkelstein & Mueth

[57] ABSTRACT

An automobile alarm system is activated by locking either of the front doors or key locked opening with the door/ignition key, said system including an armable electrical circuit for powering any automotive lights and/or horn, said armable circuit having an armed and disarmed mode, an arming circuit, and a disarming circuit, said arming and disarming circuits being closed by switches activated by said key to cause a momentary current to pulse said armable circuit into either the armed or disarmed mode, said armable circuit, when in the armed mode, being triggered by at least one automotive courtesy or dome light switch, hood switch or trunk switch to complete the circuit allowing current to flow through said circuit to said automotive lights and/or horn.

12 Claims, 9 Drawing Figures

INVENTORS
F. THOMAS COLSEN
PETER KAUFMAN
ROBERT L. TOWNSEND

BY Finkelstein & Mueth
ATTORNEYS

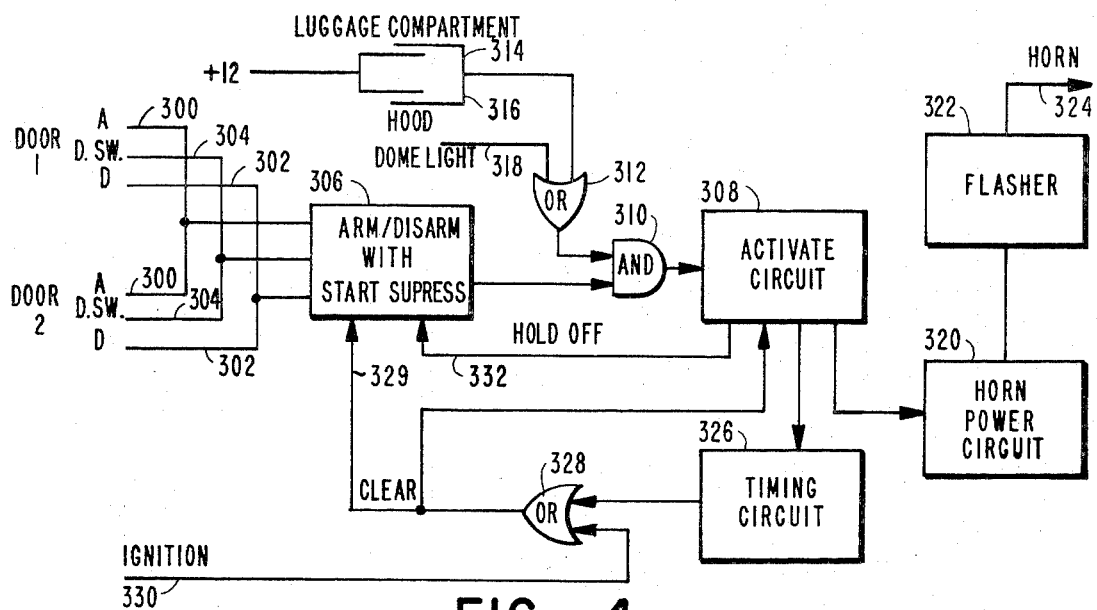
FIG.—4
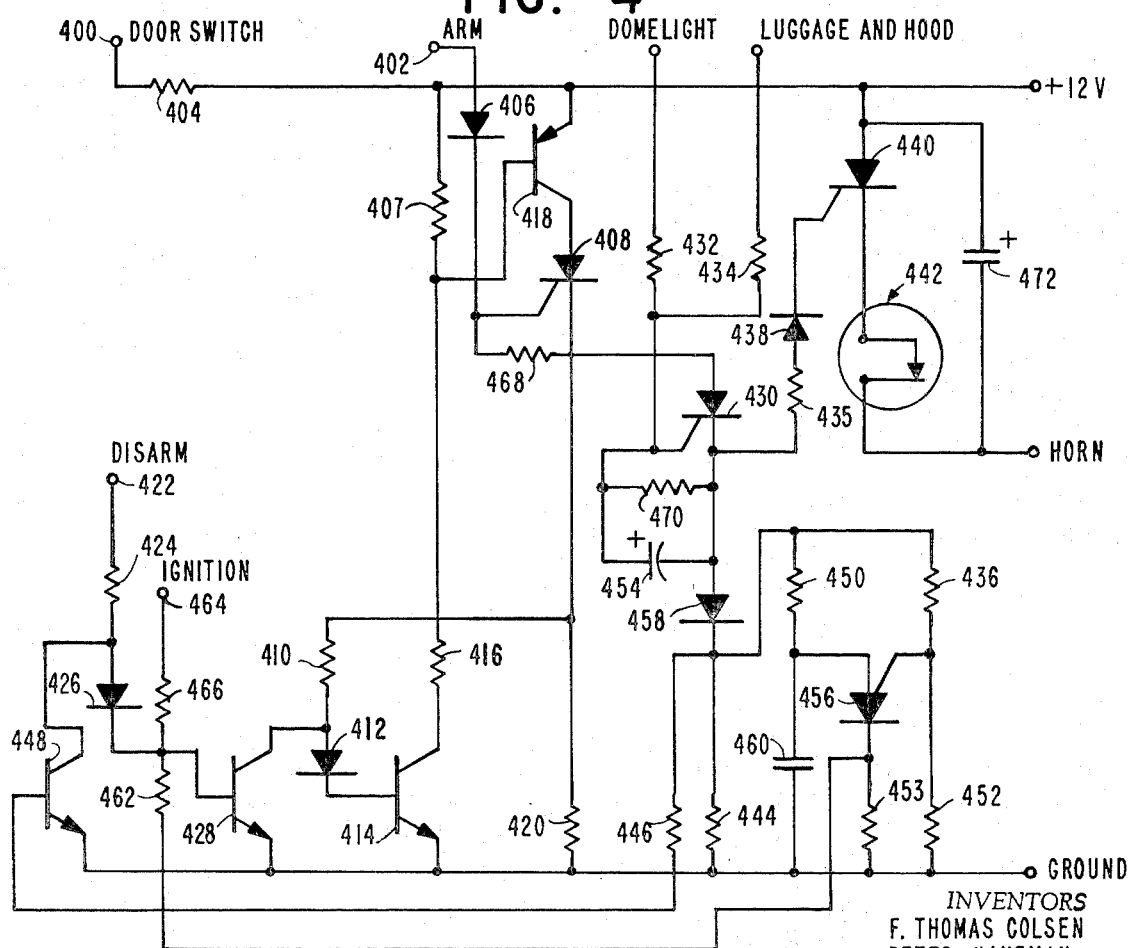
FIG.—5

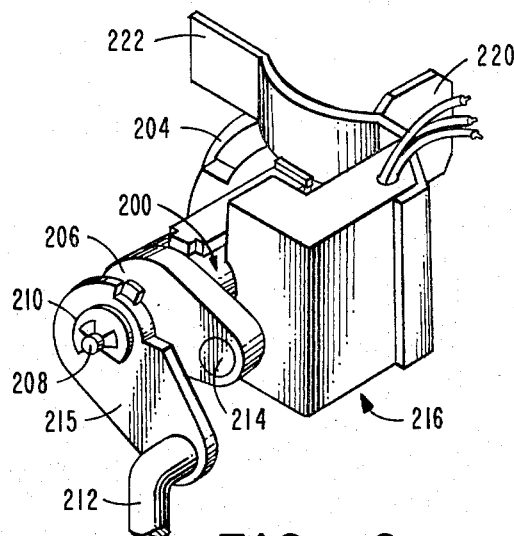
FIG.—6
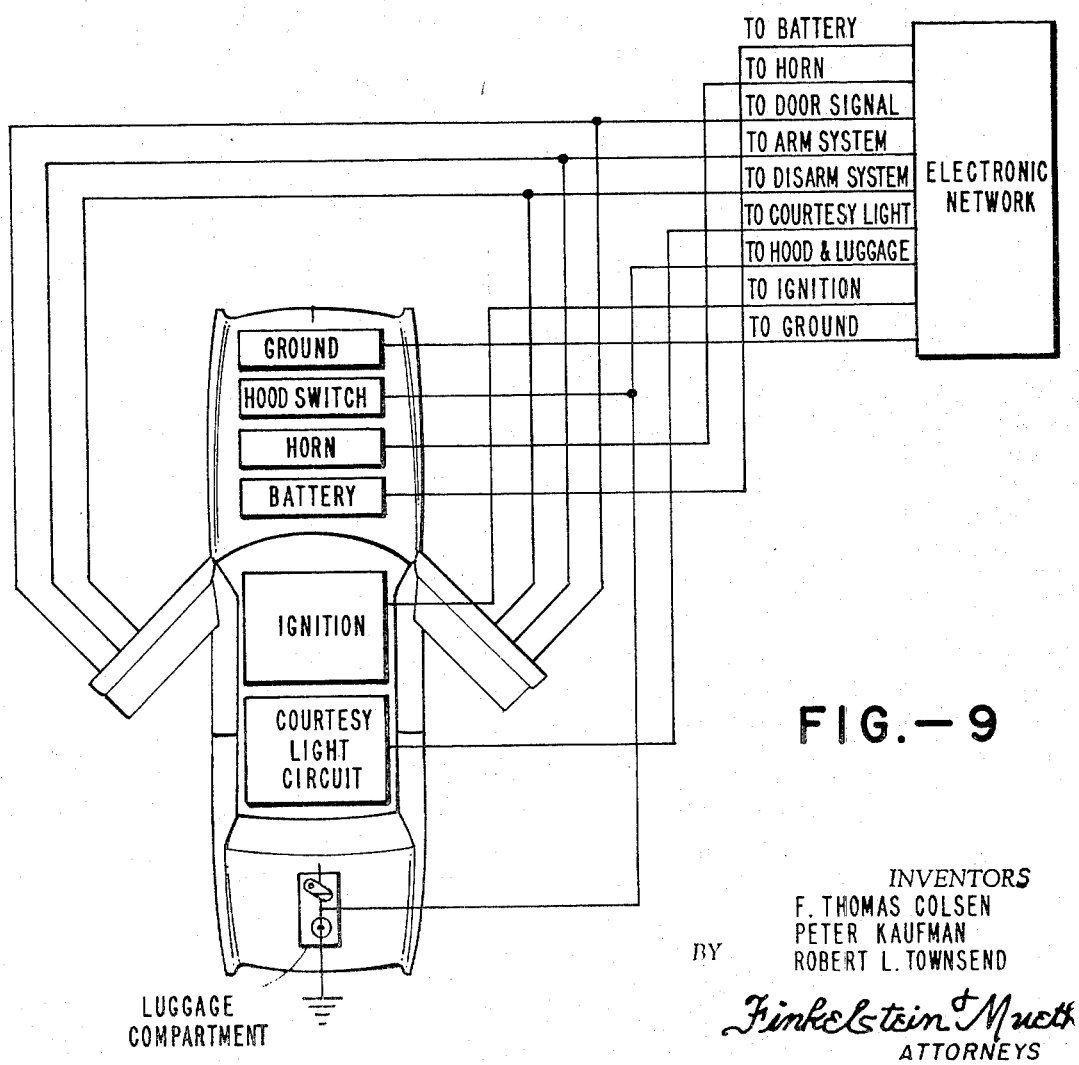
FIG.—9
INVENTORS
F. THOMAS COLSEN
PETER KAUFMAN
ROBERT L. TOWNSEND
BY
*Finkelstein + Mueth*
ATTORNEYS

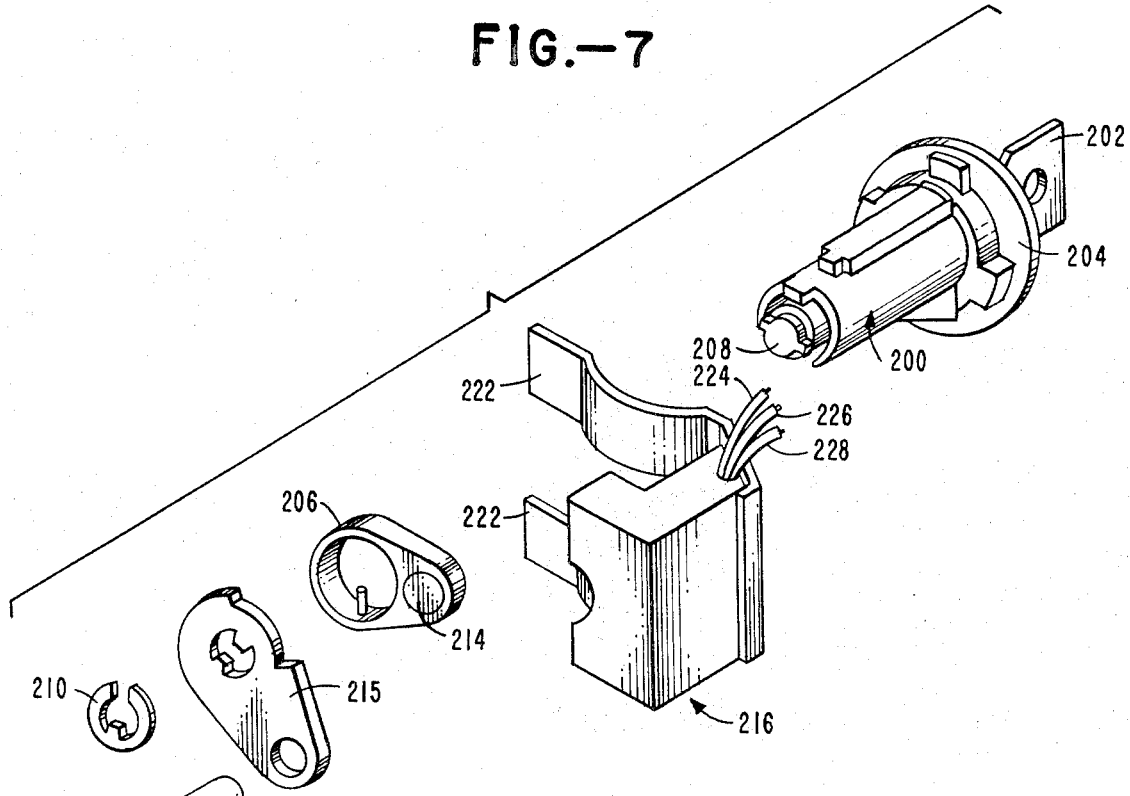
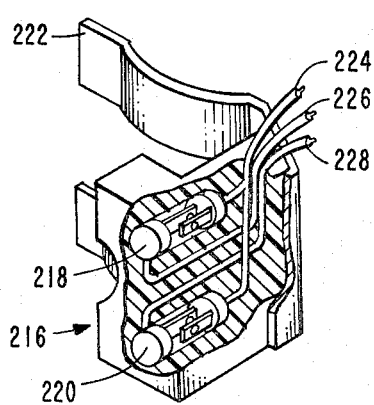

AUTO ALARM SYSTEM

BACKGROUND OF THE INVENTION

Numerous automotive alarm systems have been proposed. Most of them involve substantial modification of one or more existing automotive subassemblies, requiring additional tooling for production and final assembly. Further, the presence of many alarm systems on an automobile is immediately obvious. Since no system is completely foolproof, a readily detectable system is less desirable then one which is not conspicuous. Other alarm systems are unsightly or inconvenient for the automobile owner to use.

More recently, an automotive security system which is totally controlled by the ignition/door key has been developed. This application is the subject of U.S. Pat. application Ser. No. 188,456, filed Feb. 24, 1971, the disclosure of which is expressly incorporated herein by reference. This system is armed by locking and disarmed by unlocking the driver's door with the key. The interior door lock button has no effect on the alarm. When the alarm is armed, any access gained to the car which activates the courtesy or dome light circuit and/or hood or trunk switches will sound the horn and/or blink the lights intermittently for a predetermined length of time and then shutdown automatically. The alarm, once activated, can be shut off by unlocking the driver's door with the key and then activating the ignition with the key for a brief period. Any attempt to cut the wires leading from the door to the cowl area will not affect the alarm once it is activated. If the opened door or deck lid, which set of the system, is not closed, the alarm will continue to sound indefinitely. Two of the primary advantages of the system are its ease of use and integral design which, because of packaging, is not physically discernible to a would-be intruder. The components are easily installed with no appreciable change to existing hardware or packaging on most models. The tumbler switch is self-adjusting and may be bench assembled to the door lock tumbler for loading into the door through the door lock tumbler hole.

The present invention is concerned with a significant advance in the use of the door/ignition key to arm and disarm an automotive security system.

In the system of this invention, arming or activation is achieved by locking either front door with the door/ignition key. The system is not activated when the door lock buttons are used to lock the doors. It is necessary to lock only one door with the key to arm the system. The system is disarmed by unlocking either door with the key. The remaining doors may be opened in conventional manner with door lock buttons. When the system is armed, it is triggered by the opening of the doors, hood and/or trunk to sound the horn or blink any one or more of the automotive lights. The system can be made to shut down automatically after a desired predetermined time. The system once triggered may be deactivated by simply inserting the key in the ignition and turning to the accessory or "on" position. This system is fully compatible with existing tumbler and other door hardware including all of the tumbler devices shown in the above-identified copending patent application. It is to be anticipated that the present invention which solves numerous, longstanding problems in this art, will be rapidly and widely adopted.

SUMMARY OF THE INVENTION

Briefly, the present invention comprises an automobile alarm system adapted to be activated by locking either of the front doors with the door/ignition key or any other area utilizing a lock tumbler, said system including an armable electrical circuit for powering any automotive lights and/or horn or available device, said armable circuit having an armed and disarmed mode, an arming circuit, and a disarming circuit, said arming and disarming circuits being closed by switches activated by said key to cause a momentary current to pulse said armable circuit into either the armed or disarmed mode, said armable circuit, when in the armed mode, being triggered by at least one automotive courtesy or dome light switch, hood switch or trunk switch to complete the circuit allowing current to flow through said circuit to said automotive lights and/or horn.

In general, it is an object of our invention to provide a novel automotive alarm system which is fully compatible with existing automotive tooling and assembly procedures, is not readily detectable, can be activated by the door/ignition key, and is uniquely simple for the automotive owner to use.

More particularly, the main object of this invention is the provision of an automobile safety alarm system which can be armed and disarmed at either front door or any lock tumbler switch, and when triggered, can be shut down solely by the operation of the ignition switch.

These and other objects and advantages of the present invention will be apparent from the following detailed description and the accompanying drawings.

DESCRIPTION OF THE PREFERRED EMBODIMENTS

Turning to the drawings:

FIG. 4 is a general schematic drawing of the system.

FIG. 5 is a specific electrical schematic drawing of the system.

FIG. 6 is an assembled view of another embodiment of our invention.

FIG. 7 is an exploded view of the embodiment of FIG. 6.

FIG. 8 is a perspective view, partially broken away, showing the stitches used in the embodiment of FIG. 6.

FIG. 9 is a wiring diagram showing the installation of the system in an automobile.

Figure 1:
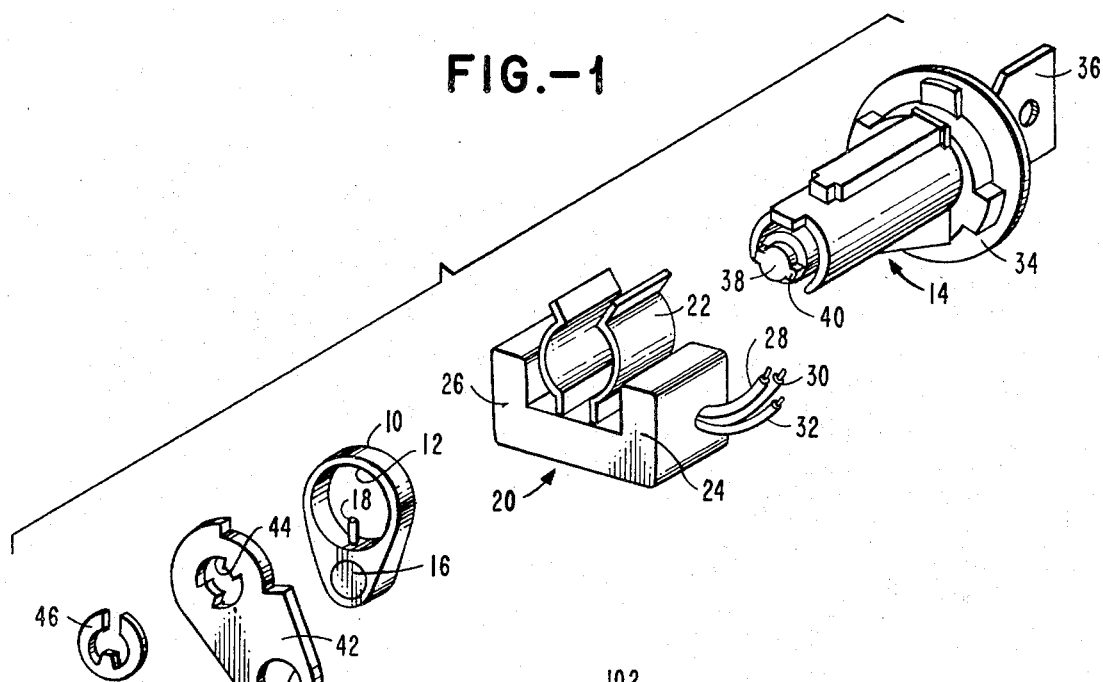
FIG. 1 is an exploded view of one embodiment of this invention.

Turning to the drawings in greater detail, in the embodiment specifically illustrated in FIG. 1, the device comprises an integral ring 10 having an opening 12 adapted to receive the lock tumbler 14. The ring 10 carries magnet 16 and pin 18 which is received in a complementary slot (not shown in this view) on the underside of tumbler 14. The switch assembly 20 is provided with a snap clip 22 for retention of the switch assembly 20 to the lock tumbler 14. The switch assembly 20 contains encased or embedded therein two switches, one positioned at point 24 and the other at point 26. Said switches are provided with leads 28, 30 and 32.

The lock tumbler 14 is provided with a conventional chromed bezel 34. The tumbler is operated by door key 36. All parts shown in FIG. 1 save the bezel and key are normally contained within the automobile door (not shown). The tumbler has a projecting shaft 38 and associated key 40. The conventional latch lever 42 has an opening 44 which snugly receives the end of shaft 38 and key 40. The other opening 45 in lever 42 receives an operating rod 47 which leads to the door lock mechanism. The keeper 46 is received on the end of shaft 38 with a snap fit to complete the assembly of that portion of this invention normally carried by the automobile door.

The inner workings of tumbler 14 are well-known and do not form a part of this invention. Hence, they are not described in greater detail in this patent. Likewise, the operation of the lever 42 and the operating rod are as in existing automobiles.

The wires 28, 30 and 32 are part of the circuit shown in greater detail in FIG. 5, hereinafter discussed in greater detail.

Figure 2:
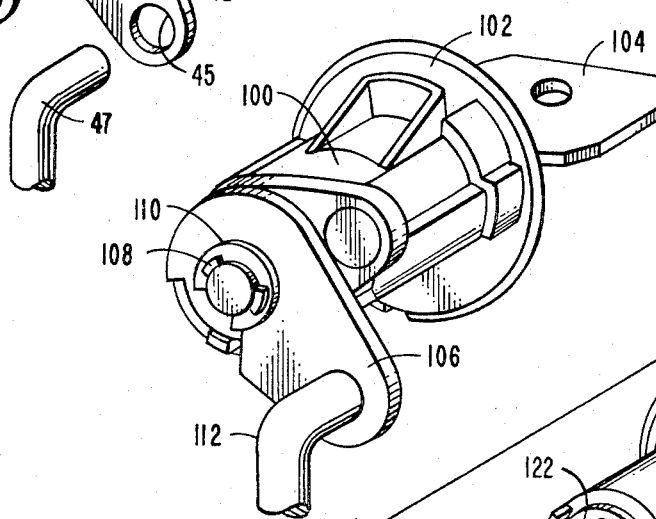
FIG. 2 is an assembled view of an alternate embodiment of this invention.
Figure 3:
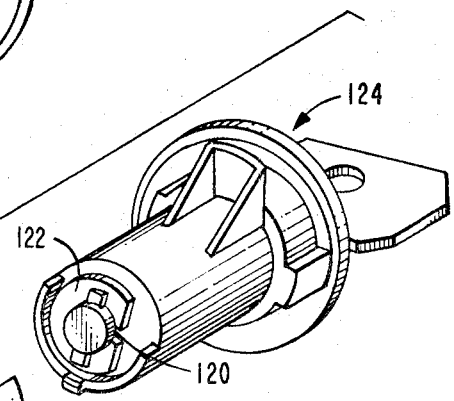
FIG. 3 is an exploded view of the embodiment of FIG. 2.
Figure 3:
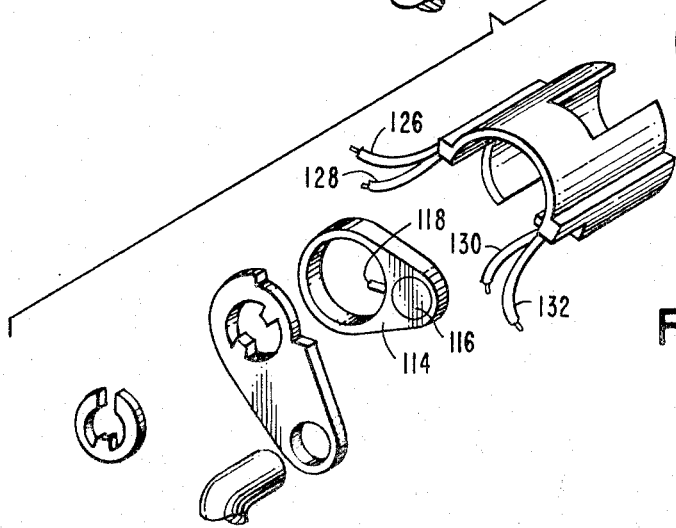

Turning to FIGS. 2 and 3, the lock tumbler 100, bezel 102, key 104, latch lever 106, key 108, keeper 110 and operating rod 112 are described above. The ring 114 has a magnet 116 and pin 118 which is received in slot 120 of the cam 122. The switch assembly 124 is provided with internally carried switches at either side. The function of leads 126, 128, 130 and 132 is discussed below.

The following relates to FIG. 5.

ARM

To arm or activate the alarm system, a pulse on the order of 10 microseconds or more is required from the door signal (pin 400) through the door switch to arm or activate pin 402. During this time period current flows through resistor 404 to the door switch, through the door switch and into pin 402 passing through diode 406 which is a negative spike protector into the gate of SCR 408. Resistor 407 is associated with diode 406. The gate-cathode of SCR 408 acts like a diode supplying base current through resistor 410 and diode 412 to transistor 414 saturating transistor 414. With transistor 414 saturated, current flows through resistor 416 saturating transistor 418. Transistor 418 supplies current through the turned on SCR 408 to the rest of the circuit with resistor 420 providing minimum holding current.

DISARM

To unlatch the alarm system a pulse on the order of 10 microseconds or more is required from the door signal (pin 400) through the door switch to disarm (pin 422). Current flows into pin 422 through resistor 424 and diode 426 (negative spike protector) into the base of transistor 428 saturating transistor 428. When the base of transistor 428 is saturated, drive is removed from transistor 414 turning off transistor 414 which turns off transistor 418. With transistor 418 off, zero current flows through SCR 408 which turns SCR 408 off and the entire system is off.

TRIGGER SIGNAL

When the system is armed, a +12 volt signal received from the courtesy light group, trunk or hood switch will trigger the system. The gate of SCR 430 is then pulled high through resistor 432 or resistor 434 turning SCR 430 on. SCR 430 now supplies power to several functions.

1. Resistor 435, diode 438 into the gate of SCR 440 turning on the horn. The flasher 442 cycles the horn power.

2. Resistor 444 for SCR 430 holding current.

3. Resistor 446 to the base of transistor 448 saturates transistor 448 to remove any latch turn-off current from having effect.

4. Time out circuit comprised of resistors 434, 436, 450, 452 and 453, capacitor 460 and programmable unijunction transistor 456. Diode 458 is placed in series with the turn-off functions of the system to protect these functions from voltage transients induced by the horn, or other transients produced elsewhere in the automotive electrical system.

TIME OUT

The programmable unijunction 456 can be set for a predetermined time constant by resistor 450 and capacitor 460. When the charge on capacitor 460 thresholds transistor 456, a positive pulse is sent through resistor 462 to saturate transistor 428 and the normal disarm sequence follows.

IGNITION TURN OFF

The ignition switch applies +12 volts to pin 464 causing current to flow in resistor 466 and into the base of transistor 428 initiating the normal disarm sequence.

Diode 412 in the base of transistor 414 insures that the saturated voltage drop of transistor 428 is less than the combined forward voltage drop of base-emitter junction of transistor 414 and diode 412. Resistors 468 and 470 are gate protect resistors for SCR 408 and SCR 430. Capacitor 454 is a transient protect capacitor for SCR 430. Capacitor 472 is a transient protect during starter engagement and disengagement.

Turning to FIG. 4, each tumbler is provided with an arm lead 300, disarm lead 302 and common or door switch lead 304. These leads are connected to the arm and disarm portion 306 of the circuit. The triggering portion of the circuit includes the activate circuit 308, ANDGATE 310, and ORGATE 312, which response to the opening of the luggage compartment 314, hood 316 or operation of the dome light 318. When triggered, the horn power circuit 320 operates the flasher 322 which intermittently blows horn 324. Circuit 308 goes to timing circuit 326 which operates through ORGATE 328 and then through clear line 329 to arm and disarm portion 306. The shut-down can also be accomplished by ignition switch 330. Hold-off provided by line 332 prevents the disarming of the triggered circuit by turning the tumbler to the disarm position, and/or cutting the wires to the door.

In the embodiment of FIGS. 6–8, the tumbler 200, key 202, bezel 204, ring 206, key 208, keeper 210, operating rod 212, magnet 214 and latch lever 215 are as previously described. The switch assembly 216 contains two reed switches 218 and 220. The assembly is attached to the tumbler clips 222. The assembly 216 is provided with leads 224, 226, and 228.

In operation, the system is armed by inserting the door key in the tumbler and turning the same to the lock position and then back to withdraw the key. The engagement of pin 118 in slot 120 causes the magnet 116 to turn or rotate with the key 104. The magnet momentarily closes one of the switches causing a current to pulse the armable circuit into the armed mode. In the armed mode, the system draws less than 0.025 amps, and zero amps in the disarmed mode. Use of the key to unlock the door causes a current to pulse the armable circuit to the disarm mode. Arming and disarming can be carried out with the door key at any door or lock tumbler provided with the switch system.

It should be noted that the system of this invention eliminates the need for a horn relay.

Many variations of our invention are contemplated. For example, the hood and trunk may or may not be included in the system. The alarm system need not contain both horn and lights. One or the other alone may be used in the system.

The invention is not limited to any particular type of switch. As will be obvious to those skilled in the art, other switches may be adapted to the system to pulse the system.

Likewise, many variations of the transistorized circuitry of this invention will be apparent to those skilled in the art which will provide the unique operation and results of the system. In addition, the circuit can be in the form of an integrated circuit or an electromechanical system.

Having fully described the invention it is intended that it be limited only by the lawful scope of the appended claims.

We claim:

1. An automobile alarm system, said system including an armable electrical circuit for powering any automotive warning device such as the lights or horn, said armable circuit having an armed and disarmed mode, an arming circuit, and a disarming circuit, said arming and disarming circuits when made each providing a momentary current to pulse said armable circuit into either the armed or disarmed mode, said armable circuit, when in the armed mode, being triggerable by a triggering means associated with a door, hood, trunk or other opening to activate the armable circuit whereby current flows to said warning device, said armable circuit when triggered being non-deactivatable by the making of said arming and disarming circuits, and the disruption of the electrical connection between said armable circuit and said disarming circuit being ineffective to disarm said armable circuit.

2. An automobile alarm system, said system including an armable electrical circuit for powering any automotive warning device such as the lights or horn, said armable circuit having an armed and disarmed mode, an arming circuit, and a disarming circuit, said arming and disarming circuits when made each providing a momentary current to pulse said armable circuit into either the armed or disarmed mode, said armable circuit, when in the armed mode, being triggerable by a triggering means associated with a door, hood, trunk or other opening to activate the armable circuit whereby current flows to said warning device, said armable circuit when triggered being non-deactivatable by the making of said arming and disarming circuits, the disruption of the electrical connection between said armable circuit and said disarming circuit being ineffective to disarm said armable circuit, said disarming circuit being operable from at least one of said doors.

3. An automobile alarm system, said system including an armable electrical circuit for powering any automotive warning device such as the lights and/or horn, said armable circuit having an armed and disarmed mode, an arming circuit, and a disarming circuit, said arming and disarming circuits when made each providing a momentary current to pulse said armable circuit into either the armed or disarmed mode, said armable circuit, when in the armed mode, being triggerable by triggering means associated with a door, hood, trunk or other opening to activate the circuit whereby current flows to said warning device, said armable circuit when triggered being disarmed by means of the automobile ignition switch, said switch being in operative electrical connection with said armable circuit, said armable circuit when triggered being non-deactivatable by the making of said arming and disarming circuits, the disruption of the electrical connection between said armable circuit and said disarming circuit being ineffective to disarm said armable circuit, said disarming circuit being operable from at least one of said doors.

4. An automobile alarm system, said system including an armable electrical circuit for powering any automotive warning device such as the lights and/or horn, said armable circuit having an armed and disarmed mode, an arming circuit, and a disarming circuit, said arming and disarming circuits when made each providing a momentary current to pulse said armable circuit into either the armed or disarmed mode, said armable circuit, when in the armed mode, being triggerable by triggering means associated with a door, hood, trunk or other opening to activate the circuit whereby current flows to said warning device, said armable circuit when triggered being disarmed by means of the automobile ignition switch, said switch being in operative electrical connection with said armable circuit, and said armable circuit including time-out means adapted to automatically shutdown said warning device a predetermined time after triggering, said armable circuit when triggered being non-deactivatable by the making of said arming and disarming circuits, the description of the electrical connection between said armable circuit and said disarming circuit being ineffective to disarm said armable circuit, said disarming circuit being operable from at least one of said doors.

5. The system of claim 3 wherein the disarming circuit is made by switch means associated with the automobile door lock and said lock has a tumbler rotatable by the door lock key to open and close said switch, when said tumbler is in the neutral or key removed position, no contact is made through either of the throws of said switch.

6. An automobile alarm system, said system including an armable electrical circuit within the automobile for powering any warning device such as the automotive lights and/or horn, said armable circuit having an armed and disarmed mode, within each of the key locked openings, an arming circuit, and a disarming circuit, said arming and disarming circuits being momentarily closable to cause a momentary current to pulse said armable circuit into either the armed or disarmed mode, said armable circuit, when in the armed mode, being triggerable by at least one automotive courtesy or dome light switch, hood switch or trunk switch to activate the circuit allowing current to flow to said warning device each arming circuit and disarming circuit being parallel to and independent of any other such circuit within said alarm system, said armable circuit when triggered being disarmed by means of the automobile ignition switch, said switch being in operative electrical connection with said armable circuit and said armable circuit including a time-out means adapted to automatically shutdown said warning device a predetermined time after triggering, said armable circuit when triggered being non-deactivatable by the making of said arming and disarming circuits, the disruption of the electrical connection between said armable circuit and said disarming circuit being ineffective to disarm said armable circuit.

7. The system of claim 6 wherein said time out means is a programmable unijunction transistor.

8. An automobile alarm system adapted to be activated by locking any key locked openings with the door/ignition key, said system including an armable electrical circuit within the automobile for powering any automotive lights and/or horn, said armable circuit having an armed and disarmed mode, within each of said key locked openings, an arming circuit, and a disarming circuit, said arming and disarming circuits being momentarily closed by switches activated by said key to cause a momentary current to pulse said armable circuit into either the armed or disarmed mode, said armable circuit, when in the armed mode, being triggerable by at least one automotive courtesy or dome light switch, hood switch or trunk switch to activate the circuit allowing current to flow to said automotive lights and/or horn, each arming circuit and disarming circuit being parallel to and independent of any other such circuit within said alarm system, said armable circuit when triggered being non-deactivatable by the making of said arming and disarming circuits, the disruption of the electrical connection between said armable circuit and said disarming circuit being ineffective to disarm said armable circuit.

9. An automobile alarm system adapted to be activated by locking any key locked openings with the door/ignition key, said system including an armable electrical circuit within the automobile for powering any automotive lights and/or horn, said armable circuit having an armed and disarmed mode, within each of said key locked openings, an armed circuit, and a disarming circuit, said arming and disarming circuits being closed by switches activated by said key to cause a momentary current to pulse said armable circuit into either the armed or disarmed mode, said armable circuit, when in the armed mode, being triggerable by at least one automotive courtesy or dome light switch, hood switch or trunk switch to complete the circuit allowing current to flow to said automotive lights and/or horn, each arming circuit and disarming circuit being parallel to and independent of any other such circuit within said alarm system, wherein said switches in each key locked opening are a pair of reed switches which are carried by the automobile door lock tumbler, said tumbler also carries magnetic means rotatable by the door lock key to open and close said switches, one of said switches being closed by rotation of said tumbler in a clockwise direction, and the other of said switches being closed by rotation of said tumbler in a counter clockwise direction.

10. An automobile alarm system, said system including an armable electrical circuit, means for arming said armable circuit, said armable circuit, when in the armed mode, being triggered by completion of said circuit allowing activation of current flow to an automotive warning device, said armable circuit when triggered being disarmed and deactivated by means of the automobile ignition switch circuit, the total disruption of the electrical connection between said armable circuit and said ignition switch being ineffective to shutdown said warning device.

11. An automobile alarm system, said system including an armable electrical circuit, said armable circuit, when in the armed mode, being triggered by completion of said circuit allowing activation of current flow to an automotive warning device, said armable circuit including time-out means adapted to automatically shutdown said warning device a predetermined time after triggering, said time-out means comprising a programmable unijunction transistor having a predetermined time constant.

12. An automobile alarm system, said system including an armable electrical circuit for powering any automotive warning device such as the lights or horn, said armable circuit having an armed and disarmed mode, an arming circuit, and a disarming circuit, said arming and disarming circuits when made each providing a momentary current to pulse said armable circuit into either the armed or disarmed mode, said armable circuit, when in the armed mode, being triggerable by a triggering means associated with a door, hood, trunk or other opening to activate the armable circuit and to cause an electrical current to flow therein and means responsive to said electrical current for energizing said warning device, said armable circuit when triggered being non-deactivatable by the making of said arming and disarming circuits, and the disruption of the electrical connection between said armable circuit and said disarming circuit being ineffective to disarm said armable circuit.

* * * * *